United States Patent [19]

Nishi et al.

[11] Patent Number: 4,914,746
[45] Date of Patent: Apr. 3, 1990

[54] ELECTRONIC DIGITAL STILL CAMERA FOR SEPARATELY STORING COMPONENT VIDEO SIGNALS IN MEMORY

[75] Inventors: Seiki Nishi; Mikio Watanabe, both of Tokyo, Japan

[73] Assignee: Fuji Photo Film Co., Ltd., Kanagawa, Japan

[21] Appl. No.: 188,403

[22] Filed: Apr. 29, 1988

[30] Foreign Application Priority Data

May 1, 1987 [JP] Japan .................................. 62-106239

[51] Int. Cl.$^4$ .......................... H04N 3/14; H04N 5/76
[52] U.S. Cl. ..................................... 358/334; 358/906; 358/909; 358/44
[58] Field of Search ....................... 358/41, 43, 44, 909, 358/906, 310, 334, 335

[56] References Cited

U.S. PATENT DOCUMENTS

| | | | |
|---|---|---|---|
| 4,074,324 | 2/1978 | Barrett | 358/909 |
| 4,345,270 | 8/1982 | Nagumo et al. | 358/44 |
| 4,355,327 | 10/1982 | Nagumo et al. | 358/44 |
| 4,456,931 | 6/1984 | Toyoda et al. | 358/909 X |
| 4,475,131 | 10/1984 | Nishizawa et al. | 358/909 X |
| 4,489,351 | 12/1984 | d'Alayer de Costemore d'Arc | 358/909 X |
| 4,527,190 | 7/1985 | Onga et al. | 358/44 X |
| 4,599,657 | 7/1986 | Kinoshita et al. | 358/44 |
| 4,646,166 | 2/1987 | Arlan | 358/334 |
| 4,647,976 | 3/1987 | Nakagaki et al. | 358/909 X |
| 4,714,963 | 12/1988 | Vogel | 358/44 |
| 4,758,883 | 7/1988 | Kawahara et al. | 358/909 X |
| 4,791,479 | 12/1988 | Ogui et al. | 358/44 X |
| 4,802,018 | 1/1989 | Tanikawa et al. | 358/909 X |
| 4,803,554 | 2/1989 | Pape | 358/909 X |

FOREIGN PATENT DOCUMENTS

| | | | |
|---|---|---|---|
| 54-140510 | 10/1979 | Japan | 358/909 |
| 58-7987 | 1/1983 | Japan | 358/909 |
| 59-183592 | 5/1987 | Japan | |

OTHER PUBLICATIONS

U.K. Patent Application No. 2089169 to Campbell, Jun. 1982.

*Primary Examiner*—James J. Groody
*Assistant Examiner*—Mark R. Powell
*Attorney, Agent, or Firm*—Birch, Stewart, Kolasch & Birch

[57] ABSTRACT

A digital electronic still camera to which detachably connected is a semiconductor memory module adapted for storage of video signals representing a still image in the form of digital data. The camera includes a connector for detachably and electrically connecting the semiconductor memory module, an imaging subsystem including an image pickup device and adapted for imaging a scene and producing video signals representative of the scene in a dot-sequential manner, a signal processor for converting the video signals produced from the imaging device into component signals and developing the component signals in the form of digital signals, and a control unit for controlling the imaging subsystem and the signal processor to cause the imaging subsystem to shoot the scene, the control unit causing the signal processor to convert the resulting video signals into the component video signals. The control unit supplies control signals to the connector for writing the component signals into the semiconductor memory module.

11 Claims, 12 Drawing Sheets

ELECTRONIC DIGITAL STILL CAMERA FOR SEPARATELY STORING COMPONENT VIDEO SIGNALS IN MEMORY

BACKGROUND OF THE INVENTION

1. Field of the Invention

This invention relates to an electronic still camera and more particularly to a digital electronic still camera in which video signals representative of a still image or scene are stored in the form of digital data in a memory.

2. Description of the Prior Art

In an electronic still camera disclosed for example in the Japanese Patent Laid-Open Publication No. 183592/1984, a memory is detachably connected to the main body of the camera which includes an optical imaging system and a solid state imaging device. Video signals representing the still image or scene imaged by the imaging device are stored in the memory in the form of digital signals. The memory, with the video signals stored therein is detached from the electronic still camera and loaded into a playback unit. The video signals read out from the memory by the playback unit are reproduced as a visual image on a screen of a video monitor.

The solid state imaging devices mounted on the camera, in general, have an array of color filter segments and spectral transmittivities that are proper to the specific imaging devices. Thus, various combinations of pixels are employed, such as the combinations of pixels of cyan (Cy), magenta (M), yellow (Ye) and green (G); red (R), green (G) and blue (B); or cyan (Cy), white (W), yellow (Ye) and green (G). In certain imaging devices, the pixels in a line are different in color from pixel to pixel, while in others, the pixels of the same color are arrayed in the perpendicular direction of a screen.

In the above noted Japanese Patent Laid-Open Publication, color separation data concerning the pixel array and spectral properties of the solid state imaging device, which is mounted on the camera, are stored in the memory in the form of codes along with the video signals each time a scene is shot by the camera. For proper color separation of the video signals, the playback unit has a series of color separation processing programs for handling a variety of the solid state imaging devices. This is in consideration that, unless the relative disposition between the pixel array of the photosensitive cells and the filter, segment array of the color filter or the phasing relation between the drive timing of the imaging device and the analog to digital converter and the timing of data writing into the memory are determined appropriately, pixel signals of the correct color cannot be reproduced upon reproducing the video signals by the playback unit. Thus, in the above noted Japanese Patent Laid-Open Publication, an occasionally suitable color separation processing program is accessed on the basis of the color separation data or information for the image at the time the video signals are read out and reproduced from the memory, and the operation of color separation is carried out in accordance with the thus selected processing program.

However, there are a number of different kinds of imaging devices and, in order that the playback unit be so designed that the video signals imaged by the different kinds of the digital electronic still cameras employing a specific imaging device may be reproduced correctly, the color separation processing programs need be stored in the memory of the playback unit in association with these different imaging devices. With the provision of a series of different color separation processing programs, the memory capacity of the playback unit is necessarily increased with increase in complexity of the system, and increased costs. In view of increasing variations in the imaging devices, it would be more and more difficult to handle them properly in the playback system.

SUMMARY OF THE INVENTION

It is a principal object of the present invention to provide a digital electronic still camera wherein the image signal processing of a playback system is not affected by the different kinds of solid state imaging devices.

According to the present invention, video signals are stored in the form of component signals from the digital electronic still camera to the memory so that processing of the video signals in the playback system may be performed independent of the different in kinds of imaging devices.

According to the present invention, there is provided a digital electronic still camera to which a semiconductor memory module adapted for storage of video signals representing a still image in the form of digital data is detachably connected. The camera comprises: connecting means for detachably and electrically connecting said semiconductor memory module; imaging means including an imaging device for imaging a scene and producing video signals representative of the scene in a dot-sequential manner; signal processing means for converting the video signals produced from said imaging means into component signals and developing the component signals in the form of digital signals; and control means for controlling said imaging means and said signal processing means to cause said imaging means to shoot the scene, said control means causing said signal processing means to convert the resulting video signals into the component video signals, and said control means supplying said connecting means with control signals for writing the component signals into said semiconductor memory module.

In the present specification, the term "component signals" means a concept somewhat contrary to the composite video signals and hence may be in the form of three primary color signals or of luminance and color-difference signals. Those component signals may naturally be dot or pixel sequential or line sequential signals.

According to the present invention, the video signals are stored in the memory in the form of the component signals that are of standard signal format as the video signals. Thus, the image may be reproduced appropriately in the playback unit without the necessity of performing imaging-device-oriented signal processing operations, such as color separation. Thus it is no longer necessary to provide a number of different kinds of color separation programs in association with the different kinds of the imaging devices resulting in simplified structure of the reproducing system, including the memory. Stated differently, video signal processing at the playback system is not affected by the differences in the different kinds the solid state imaging devices.

BRIEF DESCRIPTION OF THE DRAWINGS

The objects and features of the present invention will become more apparent from a consideration of the following detailed description taken in conjunction with the accompanying drawings in which:

FIGS. 9 and 10 show examples of signal processing circuits employed in those embodiments, wherein

DESCRIPTION OF THE PREFERRED EMBODIMENTS

Referring to the accompanying drawings, certain illustrative embodiments of the digital electronic still camera according to the present invention will be described in detail.

Figure 1:
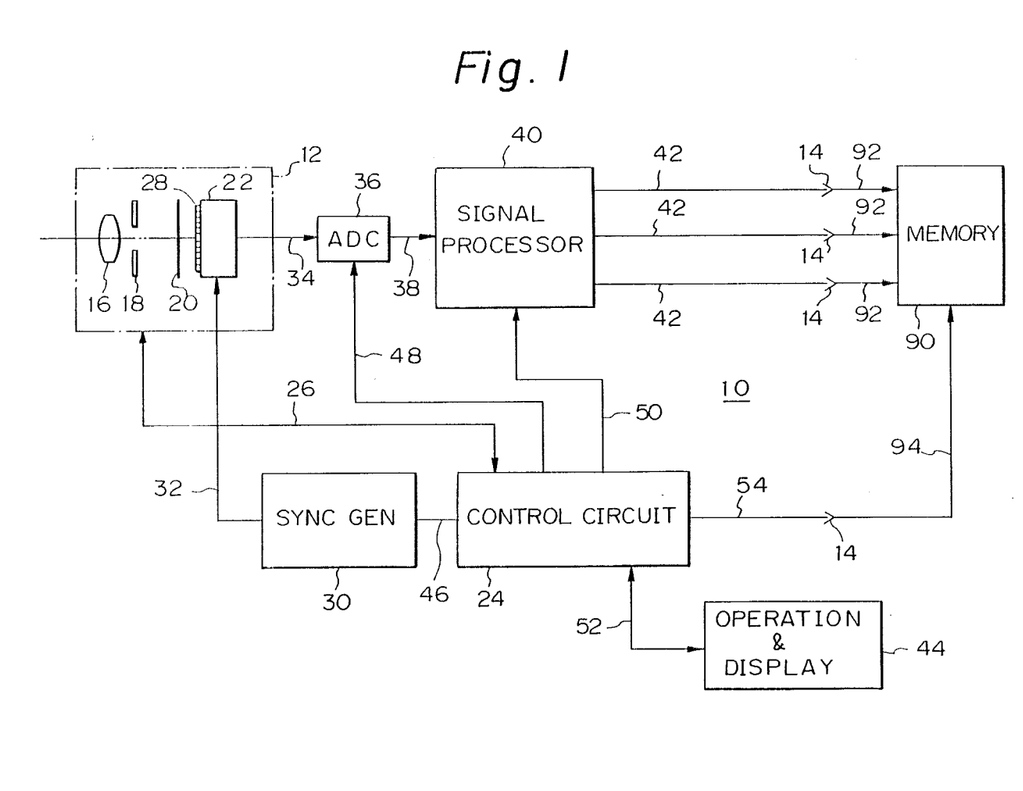
FIG. 1 is a functional block diagram showing an embodiment of the digital electronic still camera according to the present invention.

Referring first to FIG. 1, there is shown an embodiment of the digital electronic still camera comprised of a camera 10, including an imaging subsystem 12 and a memory 90 detachably connected to the camera by means of connectors 14. In FIG. 1, parts or elements towards the left of the connector 14 represent those of the digital electronic still camera enclosed in a housing, not shown.

The memory 90 is a rewritable digital storage unit loaded for example with an SRAM semiconductor memory in the form of a module such as an integrated circuit or IC card or cartridge. It has data input and output lines 92 and a control line 94 for address, read/write enable, chip select, strobe and clock signals, for example, connected by connectors 14 to the camera 10. It is noted that the connectors 14 may include power supply lines to the memory 90. When the image of a picture frame is represented by data of 1 M to 1.5 M bits, a storage unit of two chips for 24 picture frames would be realized with the memory 90 with an SRAM with the memory capacity of 16 M bits per chip.

The imaging subsystem 12 includes parts or elements necessary for shooting a still image, such as an objective lens 16, diaphragm 18, shutter 20, an imager or image pickup device 22, light and distance measurement unit, view finder, not shown, and a drive unit or units for these elements. The focusing of the objective lens 16 and the control of the diaphragm 18, as well as the opening and closure of the shutter 20, may be controlled by a control circuit 24 over a control line 26. A solid-state image pickup device, such as a CCD or MOS device, or an image pickup tube, may be advantageously employed for the image pickup device 22. A color filter 28 is attached to an array of photosensitive cells of the solid-state image pickup device. Responsive to clock signals received from a sync generator 30 on a drive line 32, the solid-state image pickup device produces color-separated image signals at an output 34 in a dot or pixel sequential fashion. The color filter 28 may have any desired disposition of filter segments.

The video signal output 34 of the image pickup device 22 is connected to an input of an analog-to-digital converter or ADC 36. The ADC 36 is a signal converter adapted for converting the video signals of the analog format at the input 34 into corresponding digital data of for example, 8 bits. The digital data are then supplied to the output 38, connected to an input of a signal processing circuit 40. As described later, the signal processing circuit 40 is a video signal processing circuit adapted for color separating video signals at the input 38 and subjecting the resulting color-separated signals to video signal processing operations such as white balance adjustment, or gradation or gamma correcting operations, prior to developing the signals at the output 42. The circuit 40 may additionally be adapted for forming chrominance or color-difference signals. The output 42 is connected to the connectors 14 of the camera.

The control circuit 24 is responsive to command signals from an operation and display unit 44 on a signal line 52. The control signals from the circuit 24 are coupled through control lines 46, 26, 48 and 50 to the sync generator 30, image pickup subsystem 12, analog to digital converter 36 and to the signal processing section 40, respectively. The control circuit 24 also operates to monitor the state of various parts of the camera through these control lines 46, 26, 48 and 50.

The control circuit 24 also has the function to control mainly the write function of the memory 90 and, to this end, has a control line 54 for write address, write enable, chip select and clock signals, for example, connected to the connector 14.

The sync generator 30 is controlled through control line 46 from the control circuit 24 and issues drive signals, such as cock or address signals, necessary to drive the image pickup device 22 to cause video signals to be issued at the output 34.

The operation and display unit 44 has a number of manually operating buttons, such as a shutter release button or those for auto/manual setting, exposure setting or white balance adjustment. With the aid of these operating buttons, the operator's commands may be entered to the camera and transmitted to the control circuit 24 over the signal line 52. The display unit 44 also operates to receive signals indicating the operating states of the camera from the control circuit 24 for display to the operator.

Figure 9:
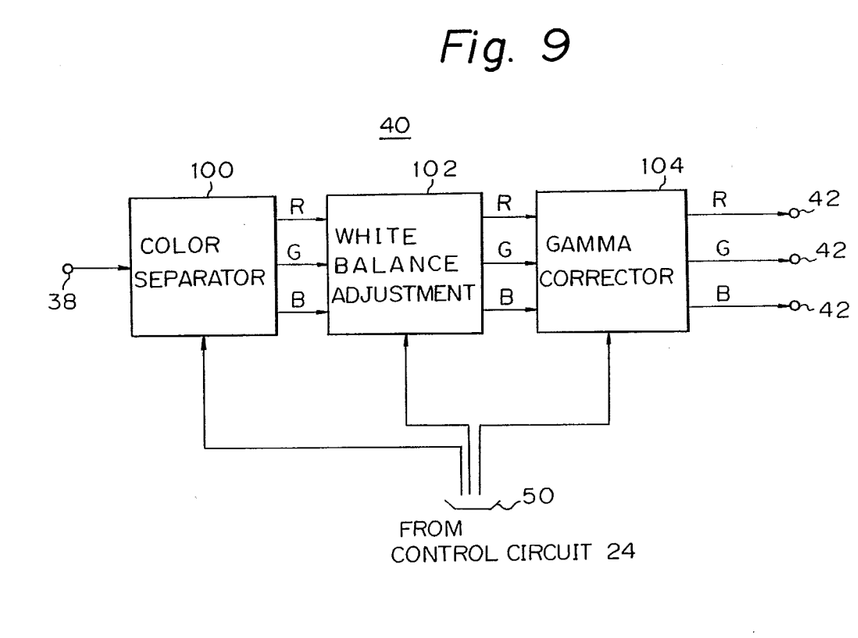
FIG. 9 shows a signal processing circuit for producing three primary colors and FIG. 10 shows a signal processing circuit for producing luminance and color-difference signals.

As shown for example in FIG. 9, the signal processing circuit 40 preferably includes a color separator circuit 100, a white balance adjustment circuit 102 and a gamma corrector 104. To the color separator circuit 100 is connected a signal input 38. The color separator 100 operates to separate pixel-sequential video signals at the input 38 into color-separated component signals, such as red (R), green (G) and blue (B) signals, in accordance with pixel clocks received from the control circuit 24 over the control line 50. This color separation is carried out in accordance with the array of the filter segments of the color filter 28 of the image pickup device 22. The filter segments may be arrayed in any suitable manner.

The color-separated component signals are introduced to a white balance adjustment circuit 102. The section 102 is responsive to control line 50 from the control circuit 24 to correct white balance deviation with the color temperature of the light source under which an image is shot with the image pickup device 22.

The white balance adjusted component are introduced into gamma corrector 104. The gamma corrector 104 operates to correct the shift or deviation in gradation caused for example by non-linear characteristics of the image pickup device 22. The output of the gamma corrector 104 is connected to the output 42 of the signal processing circuit 40.

Figure 10:
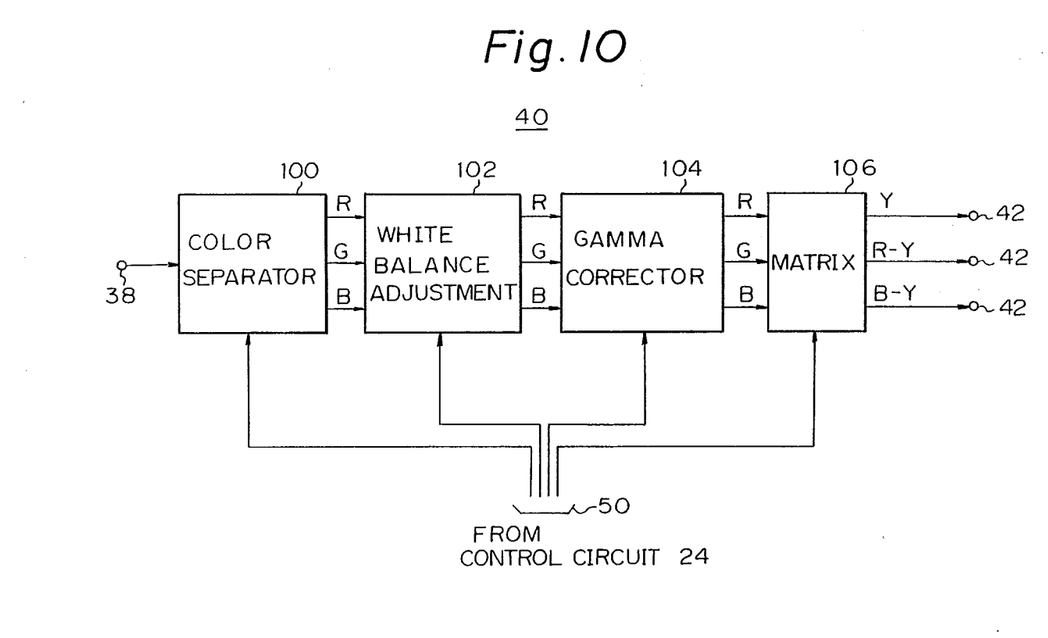

FIG. 10 shows an alternative embodiment of the signal processing circuit 40. The signal processing circuit 40 differs from the embodiment shown in FIG. 9 in that a matrix 106 is arranged between the output 42 and the output of the gamma corrector 104 in the embodiment of FIG. 10. The matrix 106 operates to produce a luminance signal Y and chrominance or color-difference signals R-Y and B-Y from the component signals R, G and B obtained at the gamma corrector 104 to transmit these luminance and color-difference signals at the three outputs 42. In this manner, the luminance signal Y and color-difference signals R-Y are issued to the outputs 42 of the signal processing circuit 40.

The signal processing circuit 40 shown in FIGS. 9 and 10 may be designed as a digital signal processing system for processing digital format color signals, or as an analog operational circuit for processing analog format color signals. Such a signal processing circuit 40 may for example be implemented advantageously on an IC chip. In the embodiment shown in FIG. 1, the signal processing circuit 40 is implemented by a digital processing system.

In operation, the memory 90 is attached to the camera by the connector 14 and then the operation and display unit 44 is manipulated to shoot or photograph an object. Signals representative of a frame of object image captured by the image pickup device 22 upon releasing the shutter 20 in response to an actuation of the shutter release button, is developed in the form of dot- or pixel-sequential video signals at the output 34 of the image pickup device 22 timed with the clock signals supplied from the sync generator 30 on the clock line 32.

The control circuit 24 enables the analog-to-digital converter 36 and the signal processing circuit 40 in response to sync signals produced by the sync generator 30. Thus the dot-sequential video signals are converted by the analog to digital converter 36 into corresponding digital data before being fed to the signal processing circuit 40. In the circuit 40 the digital data are separated in the color separating circuit 100 into for example three color component signals of red (R), green (G) and blue (B). The resulting three component signals are then adjusted for white balance and gradation in the white balance adjustment circuit 102 and the gamma corrector circuit 104, respectively. The video signals, thus modified in various manners, are issued at the output 42 in the form of the color signals R, G and B or the data of the luminance signal Y and the color-difference signals R-Y and B-Y, in the form of component signal data.

The control circuit 24 also issues control signals such as write address, write enable, chip select and clock signals, on the control line 54 to the memory 90. In timed relation therewith, video signals supplied to the data line 92 are sequentially written into storage locations of the memory 90. In this manner, video signal data representing a frame of an image are stored in the form of component signal data in the storage area of the memory 90.

In an alternative embodiment of the present invention, signal processor 40 may be adapted to accomplish data compression, such as the Hadamard transform, cosine transform or orthogonal transform, and coding of the video signal data, which is in turn transferred to and stored in memory 90.

Figure 11:
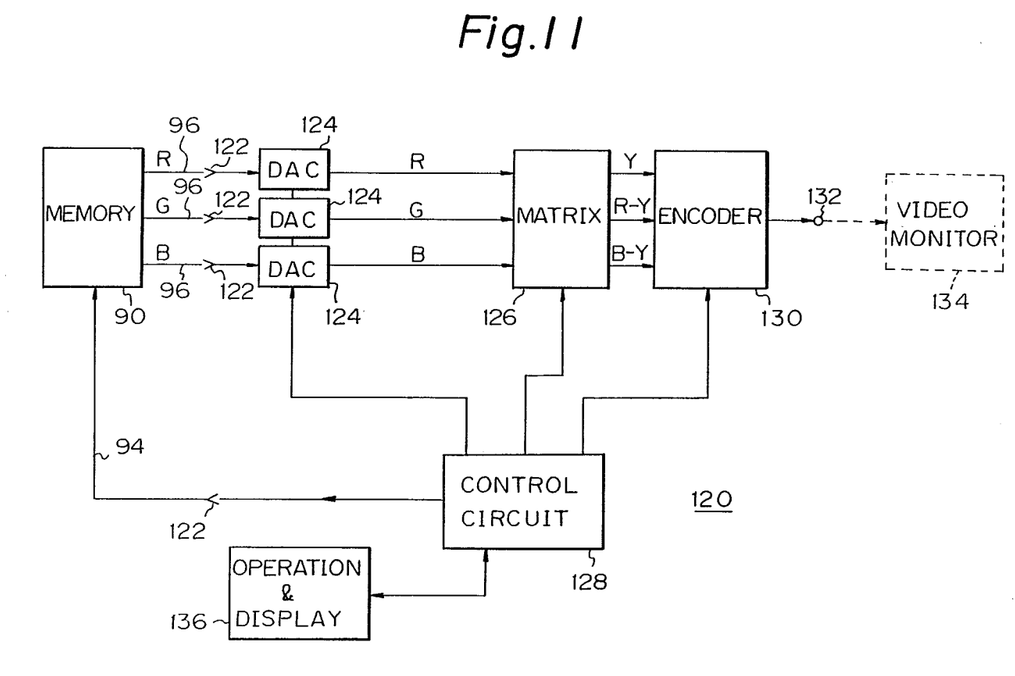
FIGS. 11 and 12 are functional block diagrams showing examples of a playback unit adapted for reproducing video signals stored in the memory in the above embodiments.

In the present embodiment, the video signals stored in the memory 90 in the form of, for example, R, G and B component signals, may be reproduced by a playback unit 120 shown for example in FIG. 11. The playback unit 120 has a connector 122 to which the memory 90 is detachably connected and by means of which a read-out data line 96 of the memory 90 is connected through a digital-to-analog converter or DAC 124 to a matrix 126. The memory 90 also has its control line 94 connected through connector 122 to a control circuit 128.

The component video signal data R, G and B read-out on the output data line 96 of the memory 90 may be converted by DACs 124 into corresponding analog signals which are then converted by the matrix 126 into the luminance signals Y and color-difference signals R-Y and B-Y. These signals are then introduced into an encoder 130 where they are converted into composite video signals which are then issued at the output 132. To this output connected is a video output device such as a video monitor 134 and/or a printer by means of which the composite video signals at the output 132 are visualized in the form of the visible image.

The various elements of the playback unit 120 are controlled by the control circuit 128. The control circuit 128 is responsive to operator's commands entered at the operation and display unit 136 to supply control signals for read-out thereof on the control line 94 of the memory 90 in accordance with a predetermined basic frequency, whereby the video signal data for a specified picture image are read out from the memory 90. These video signal data take the form of component signals, herein color signals of R, G and B, so that they are converted by a video signal processing circuit consisting of the matrix 126 and the encoder 130 into composite video signals which are then issued at the output 132. In this manner, the image represented by the video signals are visually displayed on the image monitor 134.

Figure 2:
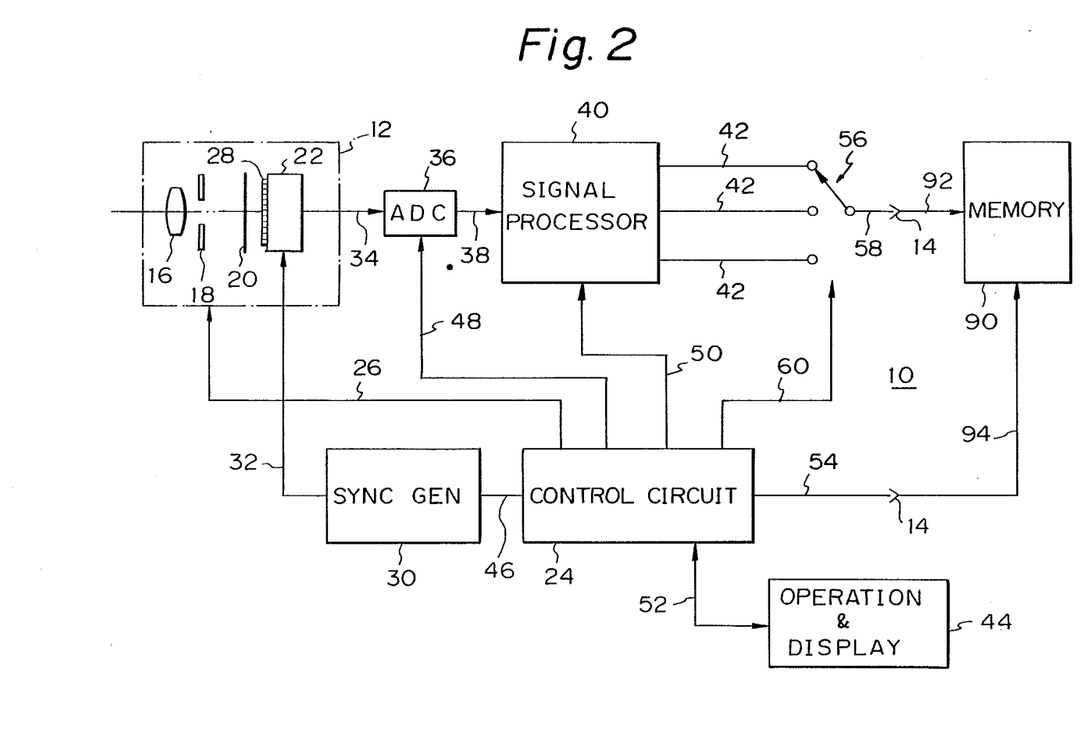
FIGS. 2 to 8 are functional block diagrams similar to FIG. 1 and illustrate alternative embodiments of the digital electronic still camera according to the present invention.

FIG. 2 shows an alternative embodiment of the digital electronic still camera which differs from the embodiment of FIG. 1 in that a switching circuit 56 is connected to three output lines 42 of the signal processing circuit 40 and has its output 58 connected to the data line of the connector 14. In the following description, the parts or elements similar to those shown in FIG. 1 are denoted by the same reference numerals. The switching circuit 56 is a selective circuit that may take either one of three selective connecting positions responsive to a control output 60 of the control circuit 24. The control circuit 24 issues switching signals associated with pixel clocks to the control line 60. Thus, the switching circuit 56 causes the color-separated component signals R, G and B or the luminance signal Y and the color-difference signals R-Y and B-Y at the three outputs 42 of the signal processing circuit 40, that is, the component signal data, to be issued dot- or pixel-sequentially at the output 58. These signal data are transmitted through the connector 14 and the data line 92 of the memory 90 so as to be written therein as the dot- or pixel-sequential video signal data.

Figure 3:
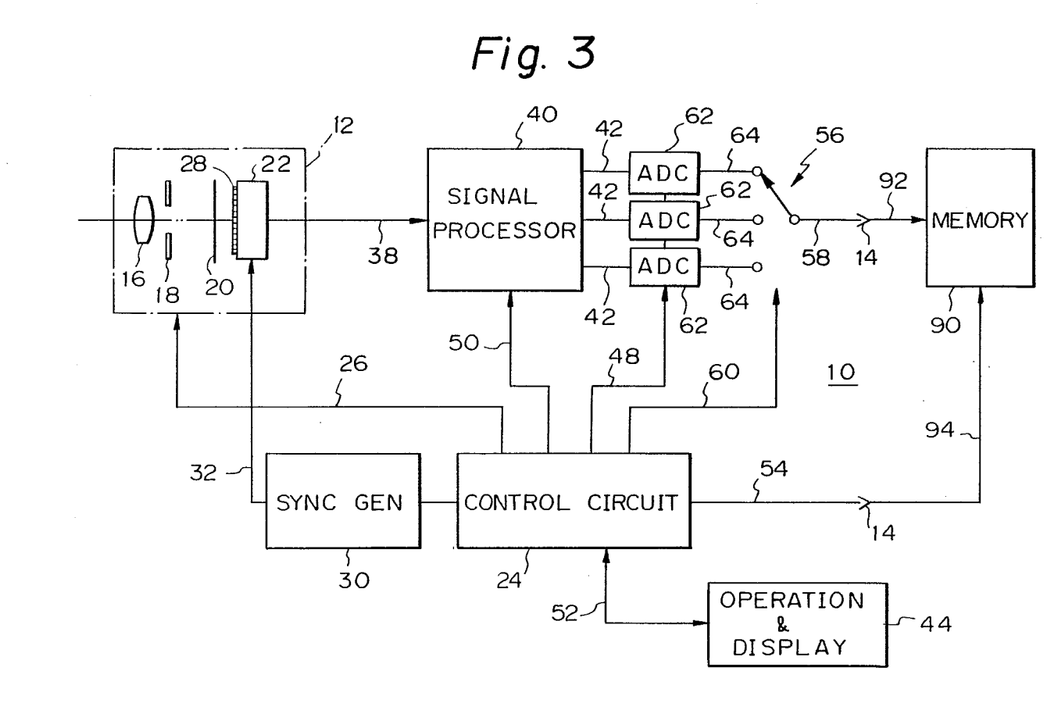

FIG. 3 shows a further alternative embodiment which differs from the embodiment of FIG. 2 in that the video signal output 38 of the image pickup device 22 is directly connected to the input 38 of the signal processing circuit 40 and that three analog-to-digital converters 62 are connected between the three outputs 42 of the circuit 40 and the switching circuit 56. Thus the signal processing circuit 40 is of the circuit configuration in which the video signals produced by the image pickup device 22 are processed while they remain in the form of analog signals. Similarly to the analog to digital converter 36, the analog to digital converters 62 operate to convert the analog format component video signals at the input 42 into corresponding digital data of, for example, eight bits, before the signals are issued at the output 64.

Figure 4:
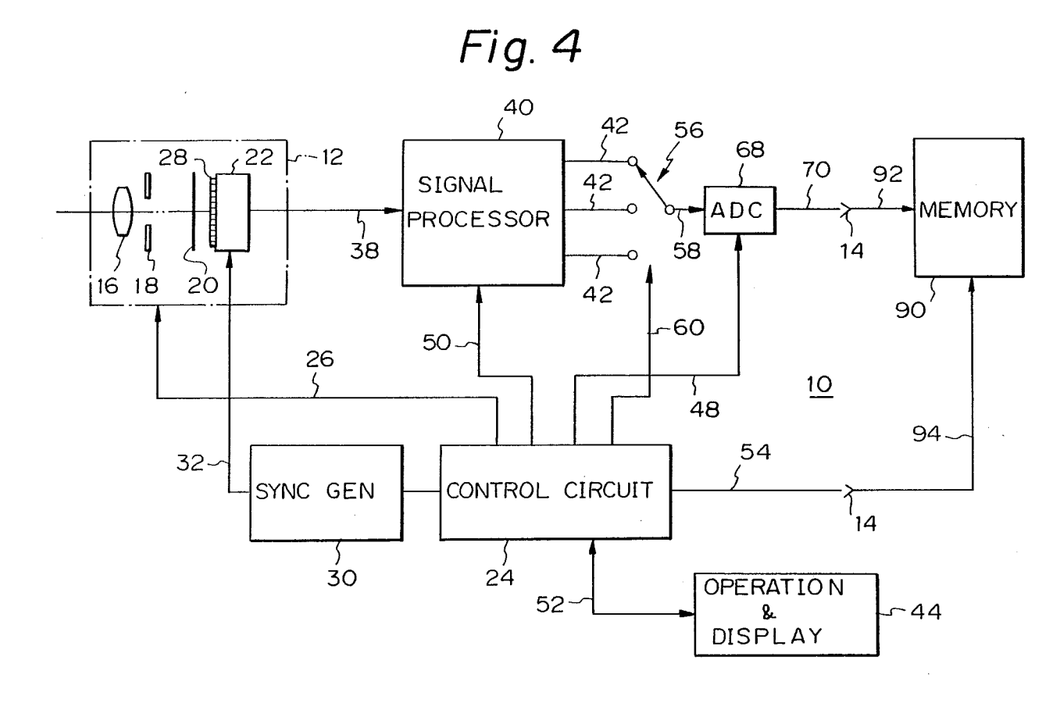

FIG. 4 shows another embodiment of the present invention wherein a single circuit analog-to-digital converter 68 is provided at the output side of the switching circuit 56 in place of the three-circuit type analog-to-digital converters 62. The present embodiment differs from the embodiment of FIG. 3 in that the switching circuit 56 is connected to the three outputs 42 of the signal processing circuit 40 and has its output 58 connected to a data line 70 of the connector 14 through the analog-to-digital converter 68. Therefore, the signal processing circuit 40 also has a circuit configuration in which the output video signals from the image pickup device 22 are processed while they remain in the form of analog signals. The analog-to-digital converter 68 operates to convert the dot-sequential component video signals of the analog format at the output 58 into corresponding digital data before the signals are issued at the output 70. In a manner different from the embodiment shown in FIG. 3, only one circuit of the analog to digital converter 68 is necessary herein such that the overall system may be simplified in structure.

Figure 5:
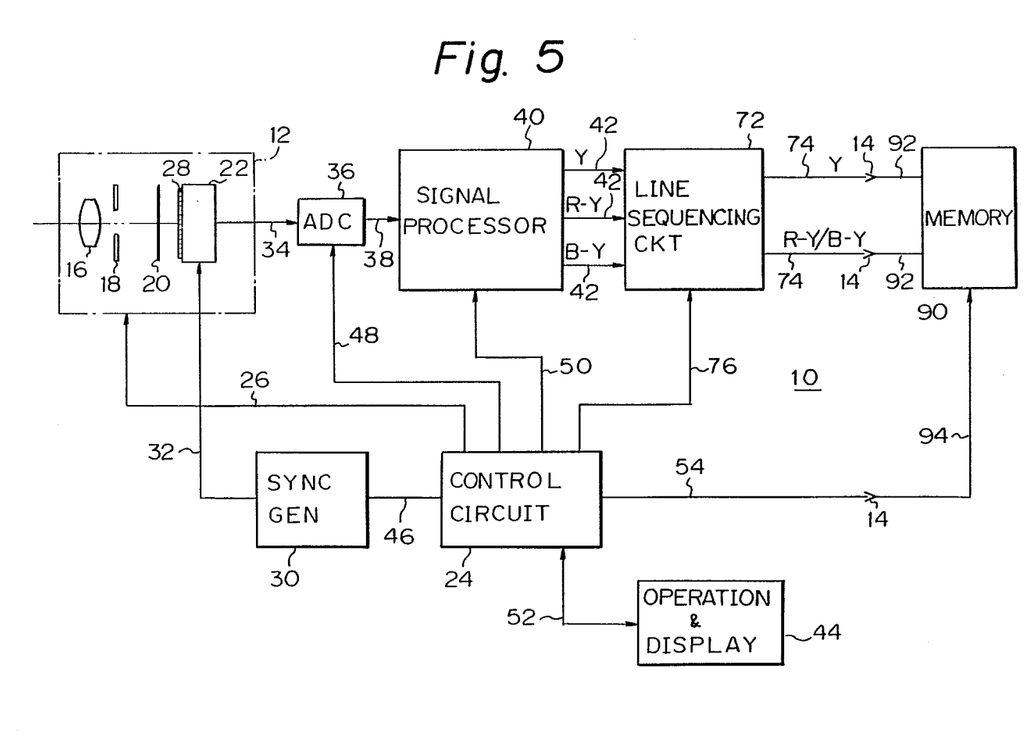

FIG. 5 shows a further modification of the digital electronic still camera which differs from the embodiment of FIG. 1 in that a line sequencing circuit 72 is connected to three outputs 42 of the signal processing circuit 40 and has its two outputs 74 connected to the data line of the connector 14. The signal processing circuit 40 herein is preferably of a circuit configuration shown in FIG. 10 in which video signal data are developed at the output lines 42 thereof in the form of the luminance signal Y and the color-difference signals R-Y and B-Y. In response to control signals that are synchronized with horizontal sync signals and that are supplied from the control circuit 24 on the control line 76, the line sequencing circuit 72 operates in such a manner that the digital data of the color-difference signals R-Y and B-Y, introduced at the output lines 42 are alternately transmitted at intervals of a horizontal scanning line to output lines 42 in the form of scanning-line-sequential chrominance signals. In this manner, the data of the luminance signal Y and the line-sequential chrominance signals R-Y and B-Y are introduced to data lines 92 of the memory 90 so as to be written therein as component signals.

Figure 12:
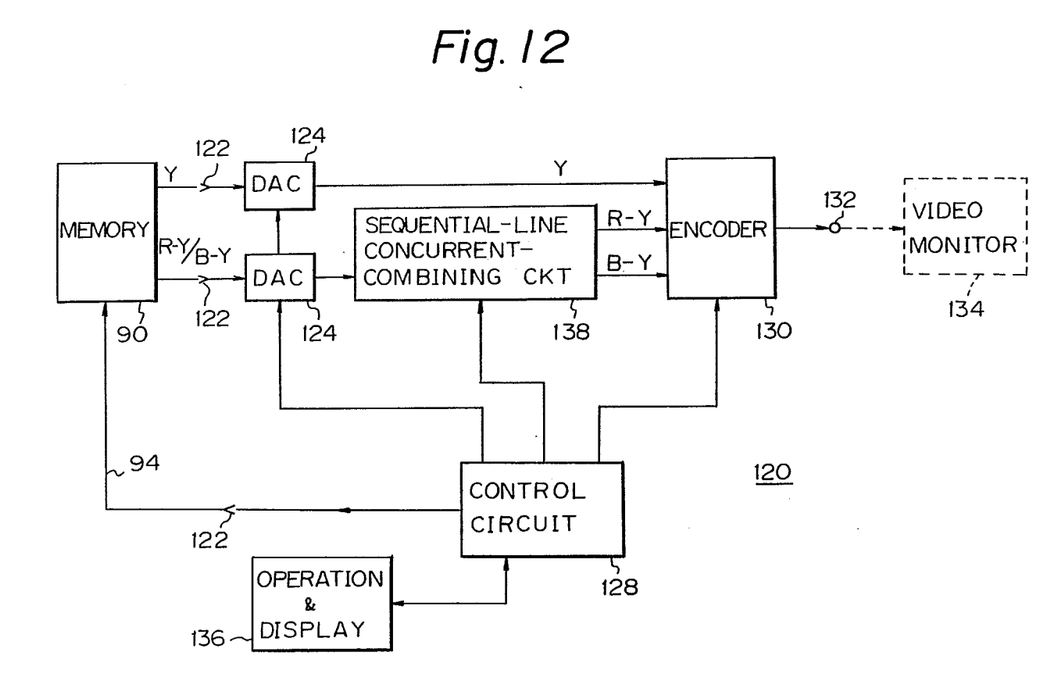

The video signals thus written in the memory 90 as the line-sequential chrominance signals are reproduced by the playback unit 120 shown for example in FIG. 12. The FIG. 12 playback circuit 120 differs from the circuit configuration of FIG. 11 in that it has a sequential-line concurrent-combining circuit 138 for concurrently combining the color-difference signals R-Y and B-Y read out line-sequentially from the memory 0, while it does not have the matrix 126. The data of the color-difference signals R-Y and B-Y read out line-sequentially from the memory 90 are converted by the digital-to-analog converters 124 into corresponding analog signals while the chrominance signals of the lacking scanning lines are interpolated and concurrently combined with those of the existing scanning lines. The composite video signals are formed in the encoder 30 using these combined chrominance signals and the luminance signal Y so as to be issued at the output 132.

Figure 6:
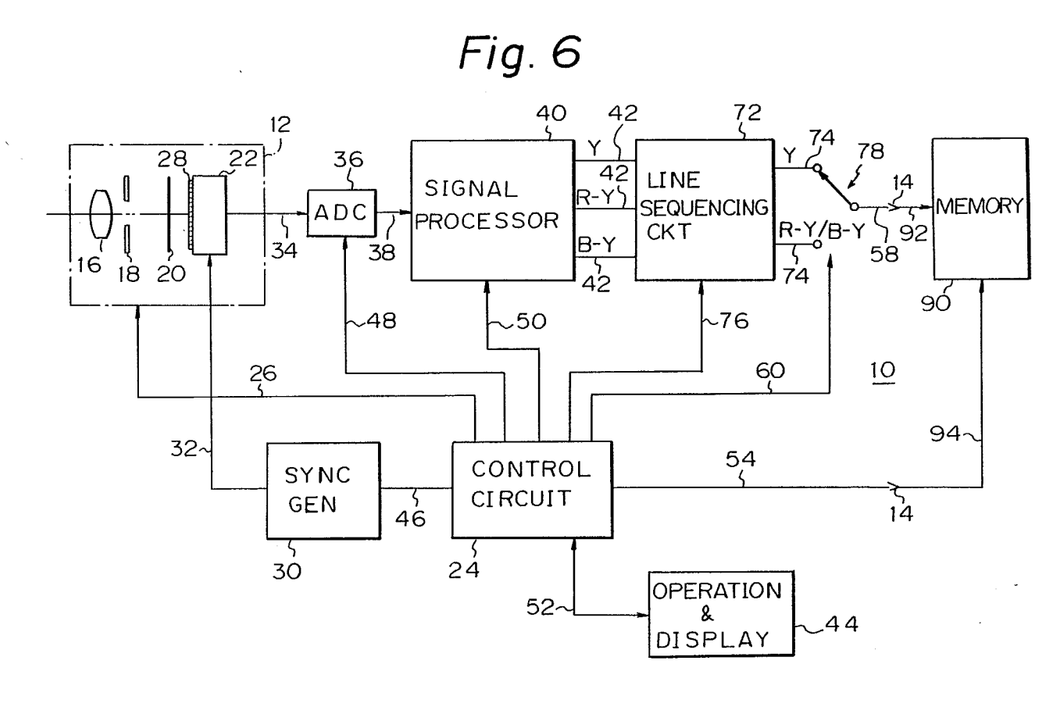

FIG. 6 shows a still another alternative embodiment wherein the line sequencing circuit 72 is connected to the output lines 42 of the signal processing circuit 40 shown in FIG. 2. The line sequencing circuit 72 has two output lines 74 connected to the connector 74 through a switching circuit 78. Similarly to the switching circuit 56, the switching circuit 78 operates to select either one of two alternative connecting positions in response to the control output 0 of the control circuit 24. In this manner, the data of the luminance signal Y and the line-sequential color-difference signals R-Y and B-Y are written dot-sequentially in the memory 90.

Figure 7:
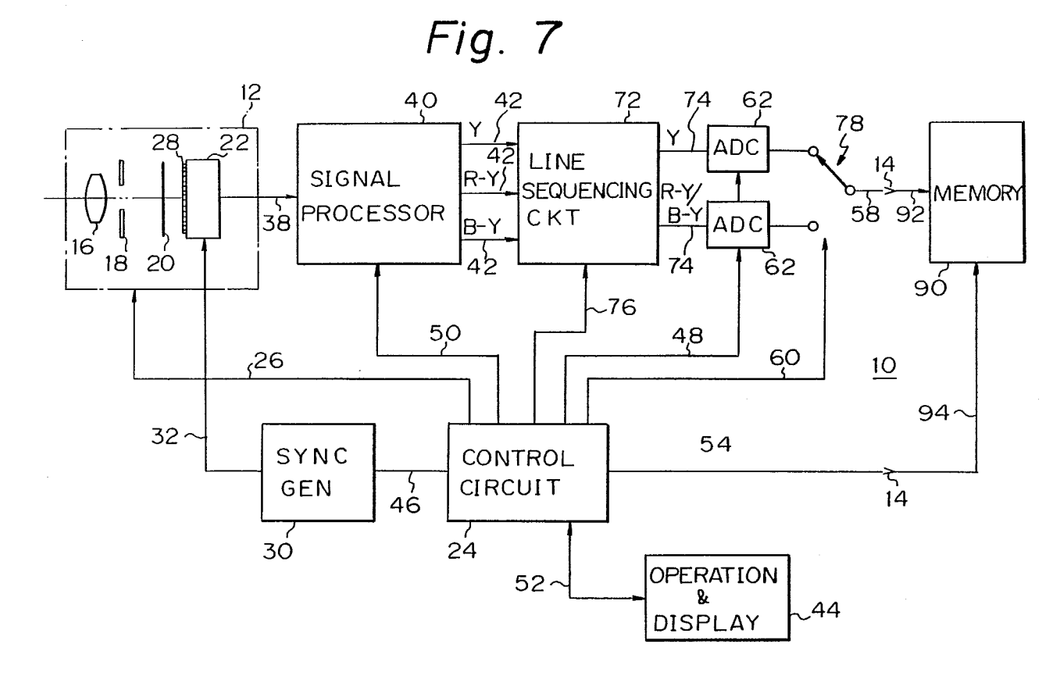

FIG. 7 shows an embodiment wherein the line sequencing circuit 72 is connected to the output lines 2 of the signal processing circuit 40 shown in FIG. 3. The line sequencing circuit 72 has two output lines 74 connected via two analog-to-digital converters 62 to the switching circuit 78. The line sequencing circuit 2 is an analog signal operational circuit adapted for sequencing the color-difference signals transmitted from the outputs 42 of the signal processing circuit 40 in the form of analog signals into scanning-line-sequential signals. The luminance signal Y and the line-sequential color-difference signals R-Y and B-Y, thus sequenced in the form of analog signals, are converted by the analog-to-digital converters 62 into corresponding digital signal data which are converted by the switching circuit 78 into dot-sequential signals for storage in the memory 90.

Figure 8:
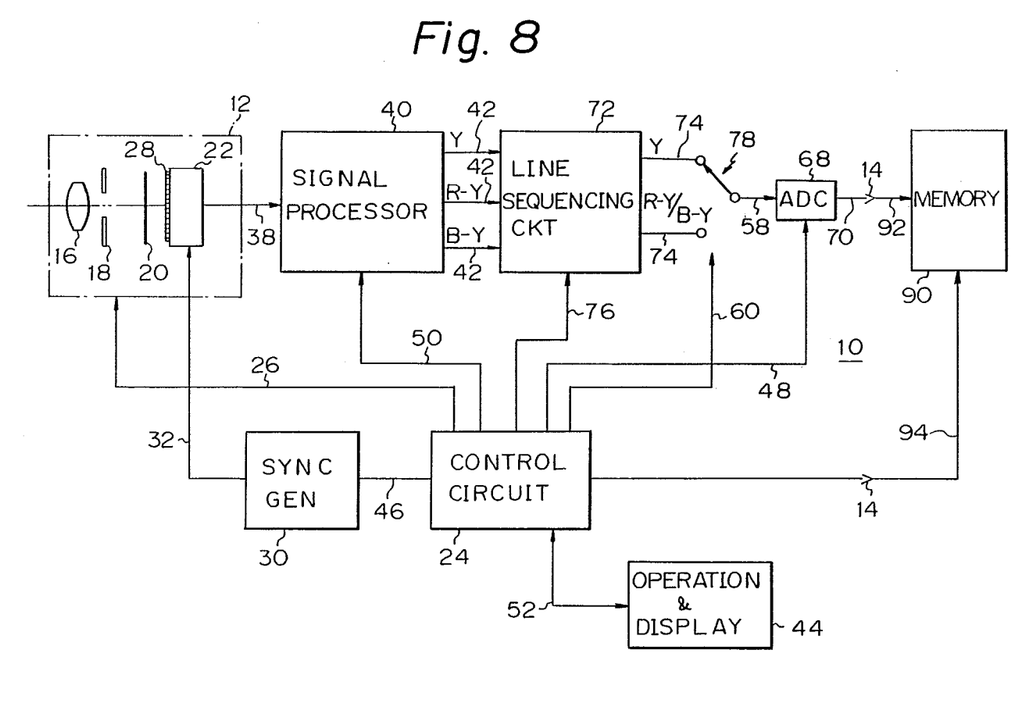

FIG. 8 shows a further embodiment in which the line sequencing circuit 72 is connected to output lines 42 of the signal processing circuit 40 shown in FIG. 4. The circuit 72 has two output lines 74 connected to a switching circuit 78 the output 58 of which is connected by way of an analog-to-digital converter 68 to the data line 70 of the connector 14. The luminance signal Y and the line sequential color-difference signals R-Y and B-Y line-sequenced in the form of analog signals are converted by the switching circuit 78 into dot-sequential signals which are converted in the analog-to-digital converter 68 into corresponding digital data for storage ultimately in the memory 90.

The video signals stored in this manner in the memory 90 are read out by the playback unit similar to that shown in FIG. 11 or 12 so as to be reproduced in the form of a visual image on an output device such as a video monitor 134.

What is claimed is:
1. A digital electronic still camera device to which a semiconductor memory module adapted to store digital data therein is detachably connected, comprising:
  connecting means for detachably and electrically connecting said semiconductor memory module to said camera;
  imaging means including a color imaging device having a color filter for imaging a scene through the color filter and producing video signals representative of a scene in the form of image signals associated with filter segments of the color filter;
  signal processing means for converting the video signals produced by said imaging means into color component signals and delivering the color component signals to said connecting means in the form of digital signals; and control means for controlling said imaging means to image the scene, and for controlling said signal processing means to convert the resultant video signals into the color components signals;

said signal processing means comprising color separator means for receiving the video signals produced from said imaging means and for separating the video signals into the color component signals associated with the video signals, producing the color component signals in parallel to each other;

said control means supplying to said connector means, control signals allowing the color component signals to be stored in said semiconductor memory module independently of each other.

2. A device, as claimed in claim 1, further comprising storage means for storing said color component signals, independently of each other, in said semiconductor memory module.

3. A digital electronic still camera in accordance with claim 1 wherein said signal processing means includes a matrix circuit for forming luminance and chrominance signals as the component signals.

4. A digital electronic still camera in accordance with claim 3 wherein said signal processing means includes line sequencing means for alternately supplying the chrominance signals to said connecting means in a horizontal-scanning-line-sequential manner.

5. A digital electronic still camera in accordance with claim 1 wherein said signal processing means produces three primary color signals as the component signals.

6. A digital electronic still camera in accordance with claim 1 wherein said signal processing means includes:
    signal converting means for converting the video signals produced by said imaging means into corresponding digital data; and
    digital signal processing means for receiving the digital data developed from said signal converting means and processing said digital data for white balance adjustment and gamma correction.

7. A digital electronic still camera in accordance with claim 1 wherein said signal processing means includes:
    analog signal processing means for receiving video signals produced from said imaging means and processing the video signals for white balance adjustment and gamma correction; and
    signal converting means for converting the video signals produced from said analog signal processing means into corresponding digital data and supplying the digital data to said connecting means.

8. A device, as claimed in claim 1, wherein said video signals representative of a scene are in the form of dot-sequential multicolor signals.

9. A method of storing digital data in a detachably connected semiconductor memory module of a digital electronic still camera, comprising the steps of:
    detachably and electrically connecting said semiconductor memory module to said camera by use of a connecting means;
    detachably and electrically connected said semiconductor memory module to said camera by use of a connecting means;
    imaging a scene through a color filter of said digital electronic still camera and producing video signals representative of the scene in the form of dot-sequential, color-separated image signals associated with filter segments of the color filter;
    separating said video signals into color component signals associated with the video signals, said color component signals being produced in parallel with each other;
    delivering the color component signals to said connecting means in the form of digital signals; and
    storing said color component signals, independent of each other, in said detachably connected semiconductor memory.

10. A method, as claimed in claim 9, further comprising the steps of:
    converting the separated video signals into corresponding digital data; and
    digital data and processing said digital data for white balance adjustment and gamma correction.

11. A method, as claimed in claim 9, further comprising the steps of:
    receiving said separated video signals and processing the video signals for white balance adjustment and gamma correction; and
    converting the processed video signals into corresponding digital data prior to supplying the digital data to said connecting means.

* * * * *